United States Patent [19]
Wolff et al.

[11] 3,731,613
[45] May 8, 1973

[54] APPARATUS FOR CONTINUOUSLY PRODUCING RAW JUICE BY DIFFUSION, ESPECIALLY FOR THE PRODUCTION OF SUGAR

[75] Inventors: Reinhard Wolff; Walter Dietzel, both of 3300 Braunschweig, Germany

[73] Assignee: Braunschweigische Maschinenbauanstalt, Braunschweig Am Altem Bahmohof, Germany

[22] Filed: Jan. 19, 1972

[21] Appl. No.: 219,067

[52] U.S. Cl. .................. 99/275, 134/104, 198/230
[51] Int. Cl. ........................................... B01d 33/24
[58] Field of Search ............... 99/275, 452, 479, 99/276, 278, 485, 28; 134/104; 198/230

[56] References Cited

UNITED STATES PATENTS

| | | | |
|---|---|---|---|
| 1,543,411 | 6/1925 | Wittig | 198/230 |
| 2,686,192 | 8/1954 | Bonotto | 99/278 |
| 3,380,373 | 4/1968 | Lenz | 99/278 |
| 3,436,226 | 4/1969 | Schaus | 99/278 |

*Primary Examiner*—Robert W. Jenkins
*Attorney*—Wolfgang G. Fasse

[57] ABSTRACT

A raw juice producing apparatus originally designed for the leaching of sugar cane raw material is adapted for use with sugar cane raw material and/or with sugar beet raw material. For this purpose a substantially horizontally travelling conveyor, the upper run of which travels over a sieve or screen bottom in a trough, is provided with an endless cover made of a fabric or netting that is permeable to liquid. Preferably, the total length of the cover comprises a plurality of fabric or netting sections secured to carrier members of the travelling conveyor. Cleaning means are arranged for cooperation with the lower run of the conveyor for maintaining the liquid permeability of the fabric or netting.

10 Claims, 3 Drawing Figures

PATENTED MAY 8 1973 3,731,613

APPARATUS FOR CONTINUOUSLY PRODUCING RAW JUICE BY DIFFUSION, ESPECIALLY FOR THE PRODUCTION OF SUGAR

BACKGROUND OF THE INVENTION

The invention relates to an apparatus for the continuous extraction of raw juice by diffusion. More specifically, such apparatus may comprise a long covered trough with an inner screen or sieve bottom. The raw material is transported through the trough by means of several parallel conveyors including chains connected in pairs by carrier members and driven by drive means so that the upper runs of the conveyors travel above the screen bottom for transporting the prepared raw material to be leached for said raw juice extraction in a longitudinal direction. The lower run or runs of these conveyors travel outside the trough.

Those skilled in the art of sugar manufacture have been trying for a long time now to find means for using the machinery and equipment of a sugar factory optionally either for the processing of sugar cane or of sugar beets. The solution of this old problem would result in a considerable increase in the productivity of sugar factories, especially those which due to their location permit an economic delivery of sugar beets and sugar cane. Assuming that the harvesting of sugar beets would not coincide with the harvesting of sugar cane, it would be possible to operate the respective sugar factory throughout the year or at least considerably longer than it is presently the case having regard to the relatively short harvesting periods.

For instance, it is common in the cane sugar industry to willingly accept losses by starting the harvest before the cane has the degree of ripeness which guarantees maximum sugar yield. Moreover, the harvesting time is extended beyond the optimum ripeness which again results in sugar losses. However, a maximum harvesting period of 6 months only can be achieved in such a way.

The harvesting of sugar beets cannot be extended to such length since the harvest must generally be completed before frost sets in. The increasing mechanization in harvesting beet crops has not only rationalized the harvesting itself but has also considerably expedited it. Thus, the producer can generally deliver the beets to the sugar factories within a few weeks. The sugar factories are able to receive and store large quantities of beets, but, for the same reasons as are prevailing in connection with the processing of sugar cane, they cannot store the beets over randomly prolonged periods of time since stored sugar beet respirate sugar and, thus cause a sugar loss.

The sugar production from sugar beets and the sugar production from sugar cane differ from each other only with respect to the raw juice extraction or production. Therefore, a device which may be used optionally for the raw juice extraction from prepared sugar beets or from prepared sugar cane, would represent a great advantage in the planning of sugar factories as it would be possible to largely standardize such factories.

Up to now, a satisfactory solution of this problem of using the same apparatus for different raw materials has not yet been found, presumably because raw juice from sugar cane has been extracted by mechanical pressing of the cane in three-roller mills whereas raw juice from sugar beets or beet cossettes has been produced by a diffusion process preferably effected in a diffusion tower. The special advantage of this diffusion process was the possibility of effecting the leaching continuously and the highly efficient yield of high-quality raw juice. However, the diffusion towers in which sugar beet cossettes are leached cannot be used for the processing of sugar cane because sugar cane cannot be brought into a similar condition as beet cossettes with respect to transporting the raw material through the diffusion tower. Broken and crushed sugar cane rather tends to form lumps and plugs which block the conveying flights or wings inside the tower.

It is quite conceivable to feed crushed or shredded sugar beets through three-roller mills being the device for the raw juice extraction from sugar cane in a sugar factory. However, the result would be sugar beet pulp, that is, the beets or the beet cossettes are merely comminuted further by the three-roller mills without extraction of any raw juice as is the case with sugar cane. Raw juice extraction would then have to be effected by hydraulic presses or other devices which have not been used for a long time now due to their well known disadvantages relating, for instance, to juice quality. Consequently, it will be appreciated that the technologies of raw juice extraction from cane and beets differ from each other to a considerable extent.

The above mentioned device for the continuous raw juice extraction by diffusion which comprises a horizontal conveyor is intended for the processing of sugar cane. The development of such a device means that the raw juice extraction by diffusion which has been applied with high yield to sugar beets can now also be applied for the processing of sugar cane. Thus, both technologies have become somewhat similar as in both instances diffusion or leaching is employed.

However, the practice has shown that the known device mentioned at the beginning is not suitable for the processing of beet cossettes because the beet cossettes which are transported in a layer over the screen bottom are ground or comminuted to an undesirable extent by the shearing forces arising at the contact surface at the screen bottom. The result is a relatively high percentage of sugar beet pulp from which raw juice can be extracted if ever by means of presses, but not in an economic way by diffusion. Moreover, the beet pulp would clog the screen openings in the screen bottom so that the juice circulation which is indispensable for the leaching of sugar beet cossettes, is cut off.

OBJECTS OF THE INVENTION

In view of the foregoing, the invention aims at achieving the following objects singly or in combination:

- to provide an apparatus which may be used with equal efficiency for the production of raw juice regardless whether beets or cane are used as the starting material;
- to avoid the above outlined drawbacks of the prior art devices while simultaneously combining the advantages in a single apparatus;
- to adapt the apparatus generally employed for the production of raw juice from sugar cane also for the production of raw juice from beet cossettes by diffusion;
- to avoid that the sugar beet cossettes are comminuted to an undesirable degree during the diffusion process;

to assure an equally high purity of the resulting raw juice regardless whether beet cossettes or prepared sugar cane are used as a starting material in the same apparatus; and to arrange the conveyor means in the above mentioned apparatus in such a manner that maintenance and repair as well as cleaning are facilitated.

SUMMARY OF THE INVENTION

According to the invention the above objects have been achieved in an apparatus which comprises substantially horizontally travelling conveyor means for transporting the shredded or crushed starting material through a diffusion trough having a screen bottom whereby the upper run of the conveyor means travels through the trough above said screen bottom and the lower run returns outside the trough, wherein the conveyor means comprise power driven endless chains and carriers connecting each pairs of said chains and arranged in spaced relation to each other and a belt made of fabric or netting and is arranged to extend between the screen bottom of the trough and the material to be leached. The fabric or netting is permeable to liquid and connected to the conveyor carriers. Cleaning means are provided over the length of the bottom run of the conveyor means in order to maintain the liquid permeability of the netting or fabric.

The invention prevents a contact between the layer of the beet cossettes to be leached and the screen bottom due to the permeable netting which is supported by the conveyor means such as carrier members. Consequently, the beet cossettes lying in the lower layer or zone remain mechanically unaffected and keep their structure or shape necessary for a satisfactory leaching during their travel through the trough. Since no beet cossettes are further comminuted, there will also be no beet pulp which could clog the screen openings of the screen bottom and interrupt the juice flow. Therefore, it is now possible to continuously produce raw juice of high quality and high yield from beet cossettes by means of the device according to the invention.

Another advantage of the apparatus according to the invention is seen in that it can also be used for the processing of sugar cane without any modification. However, it is also very simple to remove the fabric belt or netting from the carriers of the conveyor chains in case sugar cane is to be processed and to replace it in case beet cossettes are to be processed.

The cleaning means for the netting is located outside the trough in the region of the bottom run of the conveyor and prevents the formation of infection points and to maintain permeability of the netting. Thus, slimy substances which arise unavoidably during the processing of beet cossettes are prevented from clogging the netting pores.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
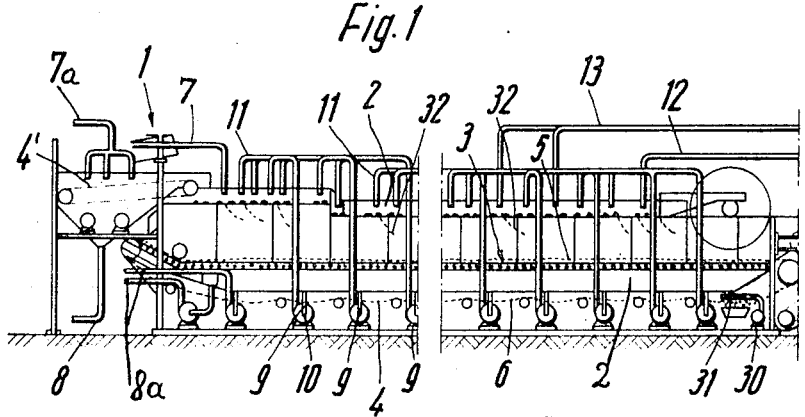
FIG. 1 shows a schematic side view of the essential elements of a device for the continuous raw juice extraction by diffusion.

FIG. 1 illustrates a partial view of a diffuser apparatus or device for the continuous raw juice extraction by diffusion. This diffuser is constructed according to the known so called Egyptian system and is only suitable for the continuous leaching of sugar cane unless it is modified as taught by the present invention.

The shown device 1 or diffuser comprises a long trough 2 which is substantially flat and covered at the top. The trough is equipped with an inner screen bottom 3. The material 14 (FIG. 2) to be leached is transported into the trough by an infeed conveyor 4' and then slowly dragged through the trough 2 over the screen bottom 3 by means of a conveyor 4 comprising several parallel conveyor chains arranged over the length of trough 2. The chains slide above the screen bottom 3 and are connected in pairs by carrier members extending across the conveying direction which is from left to right in FIG. 1.

The conveyor chains 4 travel with their upper runs 5 on the screen bottom while the lower runs 6 are located below the trough 2. At the end of the trough 2 the layer of the leached material 14, bagasse in case of sugar cane is being processed, is dewatered or pre-dewatered, respectively, and then discharged.

The leaching of the material 14 is started before entering the trough by adding juice of appropriate, high temperature through feed pipe 7a to which the juice is supplied by heat exchangers not shown, to the raw material on the infeed carrier 4' so that, for instance, beet cossettes are heated to temperatures of approximately 70 to 80° C. The juice running through this fresh material, such as cossettes, is drawn off below the infeed carrier 4' and conveyed through discharge pipes 8 as feed juice for further processing.

The leaching of the material 14 in the trough 2 is further effected by adding circulation juice of a certain temperature through feed pipes 7 to the material entering at the inlet side. In the region below these feed pipes there are discharge pipes 8a through which the juice leaves after percolating through the material layer 14. This juice is fed to the heat exchanger and then through the feed pipe 7a to the starting material.

Further discharge pipes 9 are located under the trough 2 along its length for discharging the leaching liquid and again adding it to the material by pumps 10 through feed pipes 11 arranged at a certain point ahead of the discharge point as seen in the transporting direction of the material to be leached. In this way, the leaching liquid travels through the trough 2 from the outlet side of the trough toward its inlet end and thus opposite to the transporting direction of the material to be leached because the juice is continuously discharged and readded. Fresh water is added through feed pipe 12 and recovered liquid or so called press water may be added through further feed pipe 13 as desired. A leaching process is effected in this way which is almost identical to the countercurrent principle applied in diffusion towers for the processing of sugar beet cossettes.

The special advantage of this countercurrent principle is that a substantially constant concentration gradient is obtained between the liquid and the material to be leached over the entire duration of the leaching process. The sugar content of the material to be leached has, for instance, become very low at the outlet end of the trough 2. The fresh water added at this point through feed pipe 12, however, does not contain any sugar so that the concentration gradient necessary for efficient leaching is obtained. The concentration of liquid increases with an increasing number of flows of leaching liquid through the material, the liquid, on the other hand, is added to the material of rising sugar concentration toward the infeed end of the trough 2 so that the concentration gradient indispensable for efficient leaching is assured in a continuous manner and a high efficiency can thus be obtained.

This type of leaching by percolating liquid has a further advantage with respect to the quality of the produced raw juice since the layer of the material 14 in trough 2 acts as a filter for solid impurities, so that the discharged feed juice is of a surprisingly high purity.

FIG. 1 does not show the equipment for the preparation of the material to be leached. However, such equipment is not part of the invention and can precede trough 2 depending on the kind of material. Crushing machines and comminuting apparatus will be used for the preparation of sugar cane, beet crushing machines, especially slicers, are necessary for the production of beet cossettes.

The leached material — in case of sugar cane it is bagasse — which is pre-dewatered at the end of trough 2 is further processed by respective equipment depending on its nature. The units necessary for this purpose are known and can be readily used.

Figure 2:
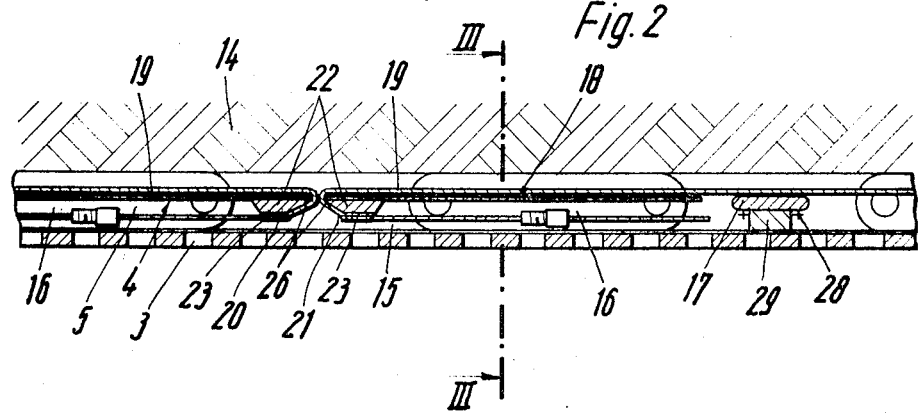
FIG. 2 shows a sectional view of the device of FIG. 1 on an enlarged scale illustrating the structure of the present conveyor.
Figure 3:
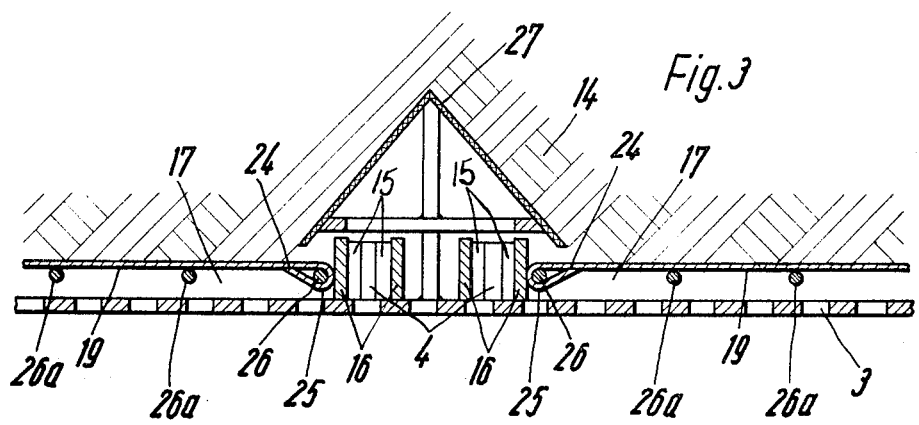
FIG. 3 shows a sectional view along line III—III in FIG. 2.

The diffuser so far described has been developed for the leaching of sugar cane and is not suitable for the extraction of raw juice from sugar beet cossettes. FIGS. 2 and 3 show the essential features of the invention for modifying the apparatus to use it optionally for sugar cane diffusion and/or for the leaching of sugar beet cossettes. FIG. 2 shows a longitudinal section through a portion of the screen bottom 3 of the trough 2. This longitudinal section also shows part of the conveyor chain 4, particularly its upper run 5. Above the upper run 5 there is shown the layer of the material 14 to be leached. The conveyor chain 4 is preferably a sprocket chain, the links of which comprise pairs of inside links 15 and pairs of outside links 16 which alternate with each other. Carrier members 17 are attached at certain intervals to the inside links 15. These carrier members extend transversely to the direction of travel. Preferably, these carrier members 17 have the form of flat bars in a diffuser for the leaching of sugar cane.

In order to avoid the detrimental contact between the layer 14 of sugar beet cossettes and the screen bottom 3, for reasons as explained above, the invention provides a belt of fabric or netting 18, for instance a filter netting, which is permeable by the liquid or juice and the upper run of which carried by the carrier member travels between the layer 14 and the screen bottom 3. Such netting 18 is located on the top side of the carrier members 17. This filter netting 18 separates the layer of sugar beet cossettes 14 from the surface of screen bottom 3 and, thus, safely avoids that shearing forces have an effect on the lower sugar beet cossette layers and that the latter are crushed to pulp.

The belt netting or fabric may be endless or, as in the illustrated embodiment, the liquid permeable netting may be subdivided into surface elements 19. As seen in the length of the conveyor chains 4, these surface elements 19 of the netting 18 should have such a size that they at least span the distance between two successive carrier members 17. A certain additional length is provided in order to attach the surface elements 19 at the front and rear edge.

The width of these surface elements 19 extends laterally close to the outside links 16 of the conveyor chains 4. In this way, the surface of the screen bottom 3 located between each of two conveyor chains 4 forming a pair is covered by netting, and a belt of liquid permeable netting 18 comprising the surface elements 19 is formed which endlessly extends over the total length of the endless conveyor chains 4.

Depending on the properties of the netting 18, it may be advantageous that the length of the surface elements 19 is such that one element spans at least the distance between three successive carrier members 17. FIG. 2 shows, especially how the front and rear edges 20 and 21 of surface elements 19 are attached to modified carrier means 22 which differ from carrier means 17 in that they particularly for this purpose, are constructed as two piece members. As can be seen from FIG. 2 the modified carrier means has round edges to assure a gentle fit of the netting 18. The ends of the surface elements 19 are attached by suitable clamping ledges 23 to the bottom side of both members of the further carrier means 22. Turnbuckles may also be used to stretch and attach the surface areas 19. Attention is to be paid that there is no gap between both members of the further carrier means 22 after assembly.

The lateral edges 24 of the surface elements 19 are constructed as hemstitches 25 into which is inserted a strand type support 26 which is secured to the carrier means 22 in any suitable manner. This strand type support 26 can, for instance, be a metal or plastic rope which strengthens the lateral edge 24 of the surface elements 19 so that it does not yield under the load of the material 14 whereby beet cossettes are prevented from entering into the region between the screen bottom 3 and the netting 18. It is also advantageous to support the width of the surface elements 19 by additional strand type supporting elements 26a as shown in FIG. 3.

Since the conveyor chains 4 comprise inside and outside links 15 and 16, a gap results between the lateral edge 24 of every surface element 19 and the adjacent inside link 15 through which sugar beet cosettes could pass. Therefore, covering elements 27 of preferably roof-shaped cross section which also cover the conveyor chains 4 are arranged along every lateral edge of the surface elements 19. These covering elements 27 reach with their bottom edges as close as possible to the top surface of the elements 19 without endangering the surface elements 19 of the netting 18. The covering elements (not shown) at the lateral walls of the trough 2 or rather at both outside conveyor chains 4 need not be roof-shaped but may be simply inclined surfaces. Thus, beet cossettes are largely prevented from entering the region between the screen bottom 3 and the netting 18.

The netting 18 prevents a contact of the material 14 to be leached with the screen bottom 3. Consequently, shearing forces between the material and the screen bottom are missing which would otherwise provide a cleaning action along the screen bottom 3. In order to avoid possible deposits which could clog the screen bottom and also to prevent the formation of infection spots, at least one carrier member 17 of every pair of conveyor chains 4 is equipped with a cleaning device 28. A simple embodiment of such a cleaning device may comprise a rubbing bar 29, made of a soft or rubber-elastic material for producing shearing forces between such bar and the surface of the screen bottom 3 when the bar is dragged over the screen bottom.

In order to keep the filter netting 18 clean, a cleaning device 30 is located in the region of the lower run 6 and equipped with high-pressure nozzles 31 which spray the netting 18 as it passes these nozzles.

The above described embodiment of the invention comprising the netting surface elements 19 with reinforced lateral edges and with front and rear edges secured to the carrier means 22 has the advantage that the small netting elements — for instance a filter netting — are relatively easy to handle and to attach to the chains without any undesired effects due to elongation or other changes in size which may occur during operation. Another advantage is seen in that such smaller surface elements can be easily exchanged and it is not necessary to exchange the complete netting surface over the total length of the conveyor chains but merely the elements which may have been worn out. The hemstitch construction of the edges and the reinforcing of the lateral edges of the netting assures a low wear and tear of the fabric or netting by the stress caused by the material 14 to be leached. Moreover, such edge construction provides an efficient counter action against the tendency of the material to enter into the region between the lateral edges of the surface elements or netting and the conveyor chain running directly next to it. It has been found that a quite efficient size for the surface areas 19 is obtained if these areas extend over at least three successive carrier members.

The most suitable conveyor means for the present purposes are sprocket chains although an open slot results between the lateral edge of the netting and the inside link 15 as mentioned above. This gap causes no problems since it may be easily covered as described above. Besides, any deposits which may be formed on the screen bottom 3, especially in the production of juice from sugar beet cossettes, in-spite of the edge covers, may be removed by said cleaning device 28, attached to at least one carrier member 17 of every conveyor chain pair.

Furthermore, it is important for the satisfactory leaching of sugar beet cossettes that the recirculation of the liquid is effected in a predetermined pattern so that the liquid percolating through the material 14 to be leached from the top to the bottom may not turn aside in a horizontal component and does not become mixed with juice of a different concentration. Therefore, the apparatus according to the invention is equipped with suspended drag sheets 32 in the region of the liquid feeding points along the top portion of the trough 2 as shown in FIG. 1. These drag sheets guide the liquid in the desired direction and also avoid the formation of foam. This is an advantage because the formation of foam would, otherwise, affect the further processing of the juice or rather its flow and removal as well as the circulation pumping.

Although the invention has been described with reference to specific example embodiments, it is to be understood that it is intended to cover all modifications and equivalents within the scope of the appended claims.

What is claimed is:

1. In an apparatus for the continuous raw juice production by diffusion wherein a long, covered trough is provided with a screen bottom, wherein raw material conveyor means travel with their upper run through said trough above the screen bottom for transporting prepared raw material longitudinally through the trough, and wherein the conveyor means return with their lower run outside said trough, the improvement comprising liquid permeable netting means forming a belt as a cover of said conveyor means, carrier members of the conveyor means for supporting said belt and for connecting the belt to said conveyor means and cleaning means arranged for cooperation with said lower run of said belt whereby said belt is maintained liquid permeable.

2. The apparatus according to claim 1, wherein said netting means forming the belt comprise a plurality of surface elements having front and rear edges as viewed in the conveying direction, clamping means for securing said front and rear edges to the carrier members of the conveyor means, said surface elements further comprising lateral edges forming longitudinal tubular means, and strand type supporting means extending longitudinally through said tubular means in the conveying direction.

3. The apparatus according to claim 2, wherein said longitudinal tubular means are formed by a hemstitch.

4. The apparatus according to claim 2, wherein said conveyor means comprise pairs of conveyor chains connected by that said carrier members, and wherein the surface elements of netting have a length extending over at least three successive carrier members as viewed in the conveying direction, said lateral edges of the surface elements extending close to said conveyor chains.

5. The apparatus according to claim 4, wherein said conveyor chains are sprocket chains, said apparatus further comprising covering means for covering said lateral edges of the surface elements of netting toward the raw material, whereby the covering means prevent the raw material from entering into the space between said screen bottom and said upper run.

6. The apparatus according to claim 2, comprising further strand type supporting means arranged longitudinally below said netting means surface elements and intermediate said lateral edges of said surface elements.

7. The apparatus according to claim 1, comprising further cleaning means attached to at least one of said carrier members for cleaning said screen bottom.

8. The apparatus according to claim 7, wherein said further cleaning means comprise a bar of yieldable material having a surface positioned in contact with the screen bottom whereby cleaning shearing forces are produced when the conveyor means move.

9. The apparatus according to claim 1, wherein said first mentioned cleaning means for the netting means is equipped with high pressure nozzles.

10. The apparatus according to claim 1, further comprising drag sheets and means for suspending said drag sheets in said trough in its upper region adjacent to liquid feeding points in the trough, said drag sheets guiding the liquid in predetermined directions and avoiding the formation of foam.

* * * * *

UNITED STATES PATENT OFFICE
CERTIFICATE OF CORRECTION

Patent No. 3,731,613    Dated May 8, 1973

Inventor(s) Reinhard Wolff et al.

It is certified that error appears in the above-identified patent and that said Letters Patent are hereby corrected as shown below:

On the cover sheet [73] Am Altem Bahmohof, Germany" should read -- Am Alten Bahnhof, Germany --; insert -- [30] Foreign Application Priority Data Germany    2 103 164.1    Jan. 23, 1971 --.

Signed and sealed this 15th day of October 1974.

(SEAL)
Attest:

McCOY M. GIBSON JR.
Attesting Officer

C. MARSHALL DANN
Commissioner of Patents